Dec. 18, 1928.  1,696,051

L. ORSZAG ET AL

TIRE

Filed May 5, 1926  2 Sheets-Sheet 1

Ladislaus Orszag
Philip Curcuruto  INVENTOR

BY Victor J. Evans
ATTORNEY

WITNESS:

Dec. 18, 1928.  L. ORSZAG ET AL  1,696,051

TIRE

Filed May 5, 1926  2 Sheets-Sheet 2

Ladislaus Orszag
Philip Curcuruto  INVENTOR

Patented Dec. 18, 1928.

1,696,051

UNITED STATES PATENT OFFICE.

LADISLAUS ORSZAG AND PHILIP CURCURUTO, OF BRONX, NEW YORK.

TIRE.

Application filed May 5, 1926. Serial No. 106,887.

This invention relates to pneumatic vehicle tires embodying a multiplicity of individual inner tubes positioned within a tire casing to relieve and overcome the usual necessity of repairing and replacing an inner tube when the tire is punctured and deflated.

An object of the invention is to provide separable tire casing sections within which the inner tubes may be placed and which may be removed as a unit to overcome the usual necessity of removing the tire rim.

More specifically stated each of the inner tubes provide separate valves and attaching means upon the tire rim to prevent independent circumferential movement thereon.

With the above and other objects in view, the invention further includes the following novel features and details of construction, to be hereinafter more fully described, illustrated in the accompanying drawing and pointed out in the appended claim.

In the drawings:—

Figure 1:
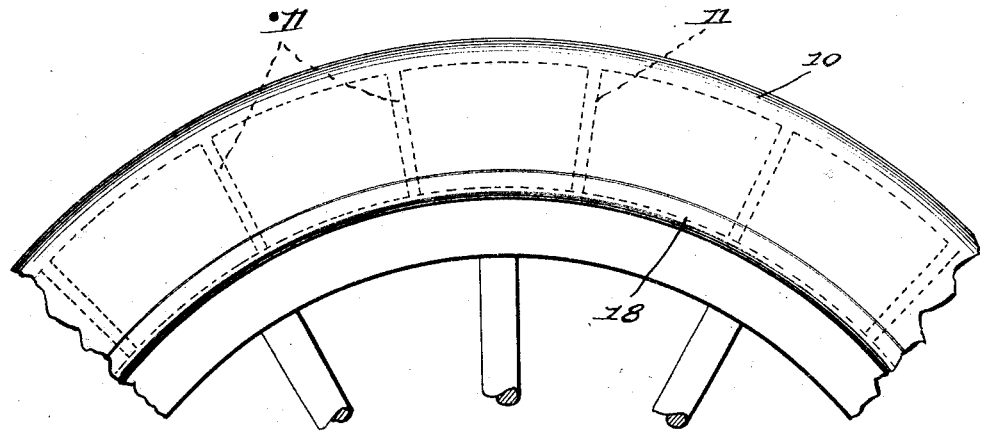
Figure 1 is a fragmentary view of the tire casing constructed in accordance with the above entitled invention.
Figure 2:
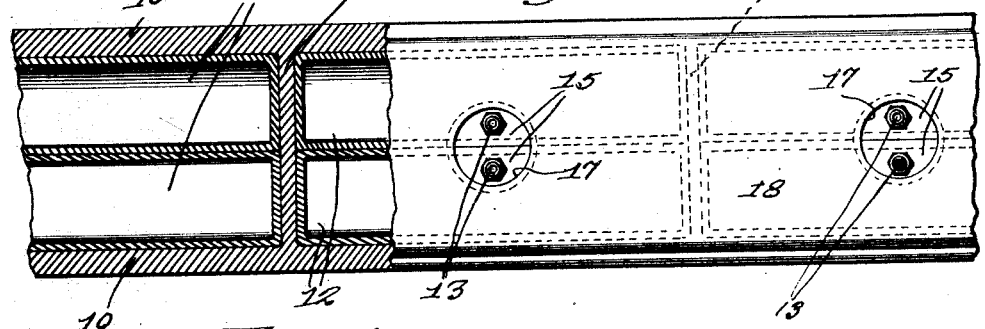
Figure 2 is a fragmentary view of the invention as arranged upon the conventional form of tire rim.
Figure 3:
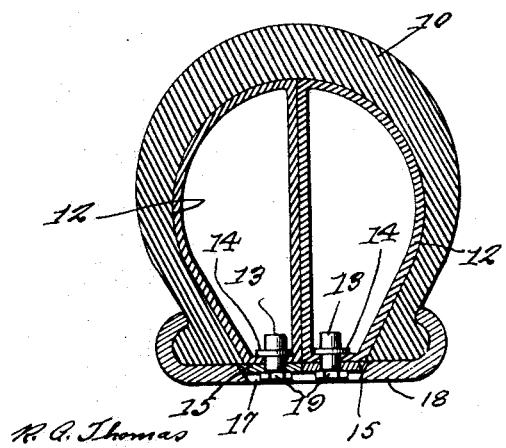
Figure 3 is a sectional view taken through the tire casing and illustrating the relative arrangement of the inner tubes.
Figure 4:
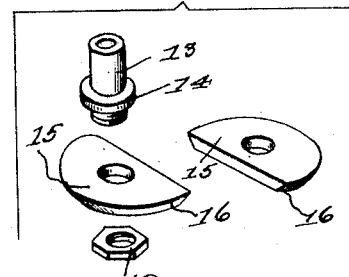
Figure 4 shows perspectives of the valves and attaching means.

Referring to the drawing in detail wherein like characters of reference denote corresponding parts, the reference character 10 indicates a tire casing having radially disposed partitions 11 integrally formed therein, substantially as illustrated in Figures 1 and 2 of the drawing.

Positioned within each of the compartments defined between the partitions 11 are companion inner tubes 12; each of which has air valves 13 depending therefrom. Said air valves provide annular flange portions 14 engageable with the inner side walls of the tubes 12 while their remaining lengths extend through semi-circular plates 15, having tapered side edges 16 fitted within and against correspondingly disposed side walls, of openings 17 arranged at spaced intervals along the length of the tire rim 18. Retaining nuts 19 are carried by the remaining lengths of the valves 13 upon the inner side of the rim 18.

It will be noted that the arrangement of a pair of individual inner tubes within each of the compartments will overcome the usual necessity of changing the tire in its entirety upon the puncture of any one of the inner tubes. Upon the puncture or deflation of any one of the inner tubes, its companion inner tube may be inflated to fill the entire compartment in order that the tire in its entirety will give an even traction and resiliency throughout its circumference.

Figure 5:
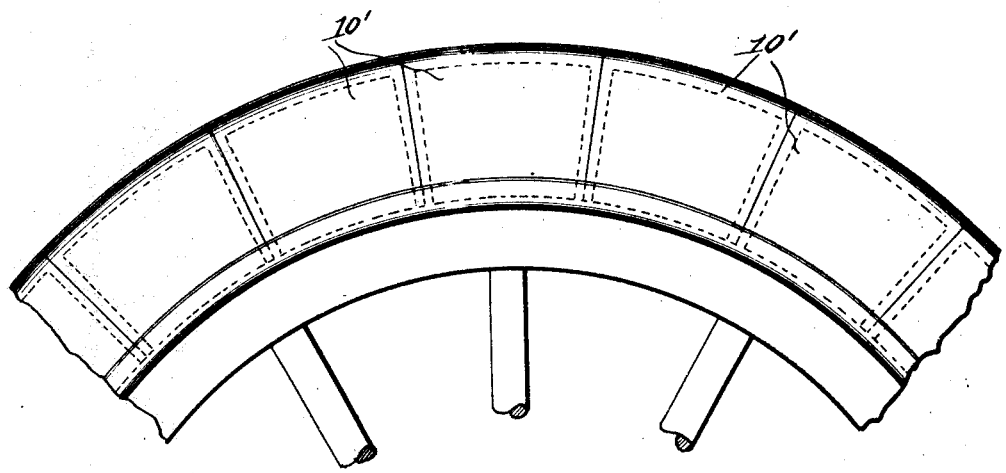
Figure 5 is an elevation of the separable tire casings forming the subject matter of a modified form of the invention.
Figure 6:
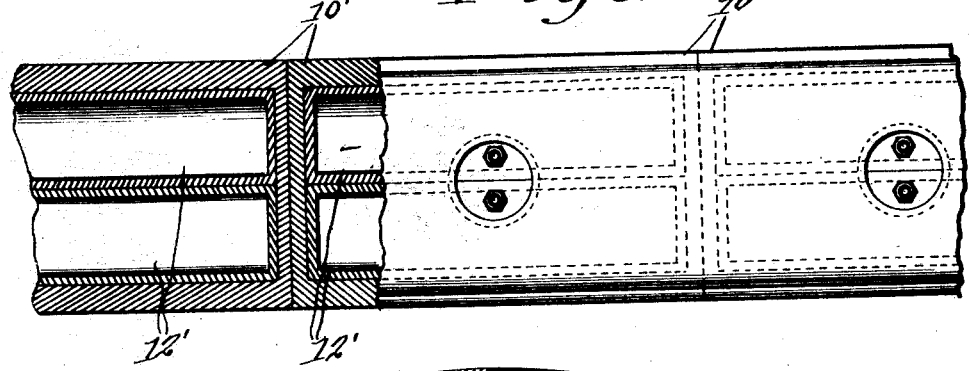
Figure 6 is a similar view to that of Figure 2 illustrating the relative arrangement of the inner tubes within each of the separable tire casings.
Figure 7:
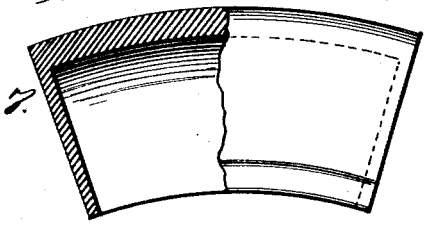
Figure 7 is an elevation of a separable tire casing partly broken away.

In Figures 5 to 7 inclusive, we have illustrated a modified form of the invention embodying separable and individual tire casing 10' within which pairs of inner tubes 12' may be positioned and secured as in the instance of the tubes 12 in the preferred embodiment of the invention.

The modification offers the advantage of permitting the removal and replacement of an individual tire casing when deflated or worn.

The invention is susceptible of various changes in its form, proportions and minor details of construction, and the right is herein reserved to make such changes as properly fall within the scope of the appended claim.

Having thus described our invention what we claim is:

A valve stem housing construction comprising a tire rim having a series of beveled circular openings, the larger diameter of the openings being on the outside circumference of the rim, pairs of semi-circular beveled plates fitting each of the said openings, a valve stem passing through and secured to each one of each pair of semi-circular plates whereby the air pressure forces the valve stems outward and the beveled plates engage the sides of the openings, the said plates being arranged in each pair so that one may be removed or both may be removed at the same time, thereby allowing one section of the tube to be removed without disturbing the other section.

In testimony whereof we affix our signatures.

LADISLAUS ORSZAG.
PHILIP CURCURUTO.